United States Patent [19]

Cheung

[11] 4,193,793
[45] Mar. 18, 1980

[54] POROUS METAL-ALUMINA COMPOSITE

[75] Inventor: Harry Cheung, Buffalo, N.Y.

[73] Assignee: Union Carbide Corporation, New York, N.Y.

[21] Appl. No.: 850,008

[22] Filed: Nov. 9, 1977

Related U.S. Application Data

[60] Division of Ser. No. 698,030, Jun. 2, 1976, Pat. No. 4,058,485, which is a continuation of Ser. No. 536,646, Dec. 26, 1974, abandoned.

[51] Int. Cl.² .......... B01J 23/62; B01J 23/74
[52] U.S. Cl. .......... 75/235; 428/550; 428/566; 252/466 J; 252/466 PT; 252/466 R
[58] Field of Search .......... 257/466 J, 466, PT, 257/466 R; 428/550, 566; 75/235

[56] References Cited

U.S. PATENT DOCUMENTS

| 2,822,397 | 2/1958 | Winstrom | 252/466 J |
|---|---|---|---|
| 2,838,444 | 6/1958 | Teter et al. | 252/466 PT |
| 2,838,445 | 6/1958 | Teter et al. | 252/455 PT |
| 3,186,957 | 6/1965 | Stiles | 252/466 J |
| 3,393,968 | 8/1968 | Lavendel et al. | 75/235 |
| 3,947,381 | 3/1976 | Campbell et al. | 252/466 J |
| 4,064,152 | 12/1977 | McArthur | 252/466 J |

Primary Examiner—Brooks H. Hunt
Attorney, Agent, or Firm—Alvin H. Fritschler

[57] ABSTRACT

A porous composite structure comprising a sintered mixture of metal particles and alumina particles, and a method for producing this composite. The composite is useful as a catalyst support, particularly in apparatus designed to reduce pollutant emissions from automobile engines.

7 Claims, 7 Drawing Figures

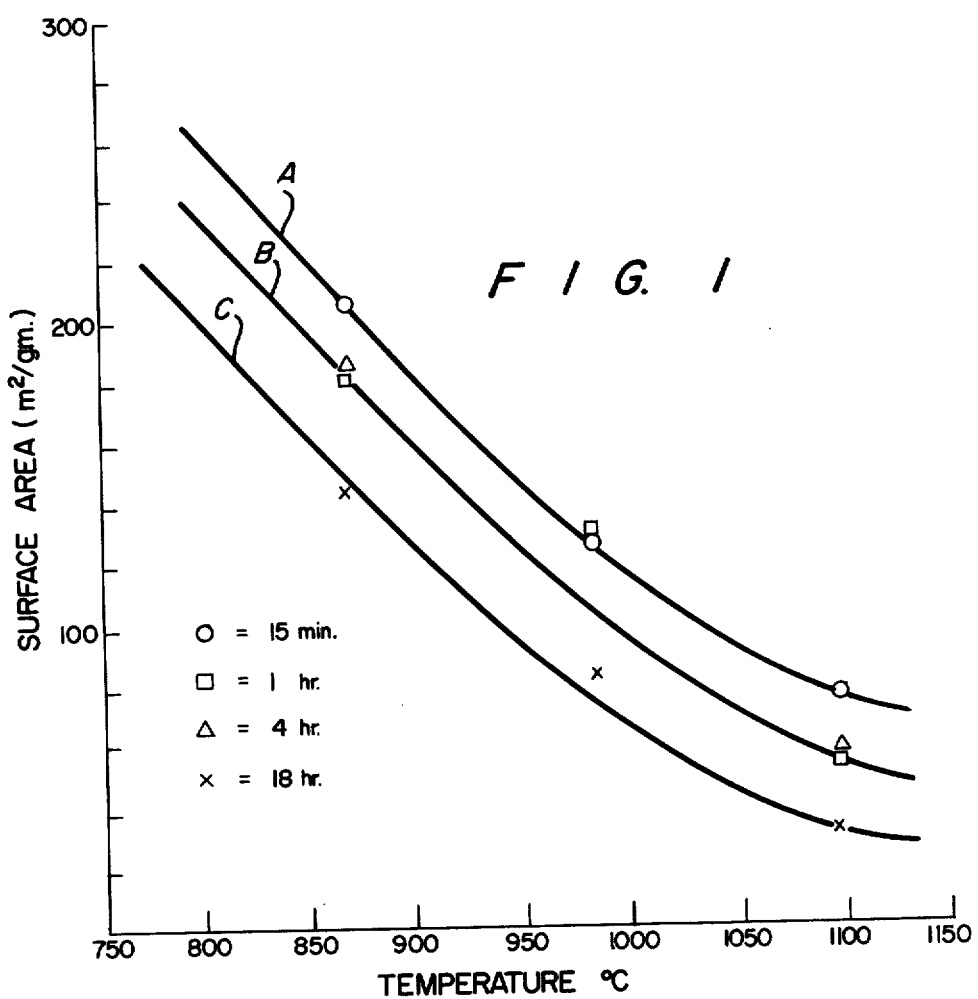

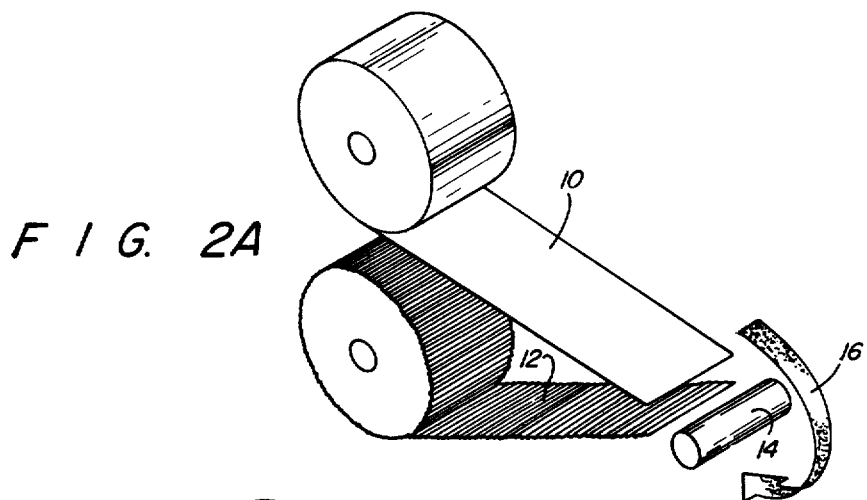
F I G. 2A
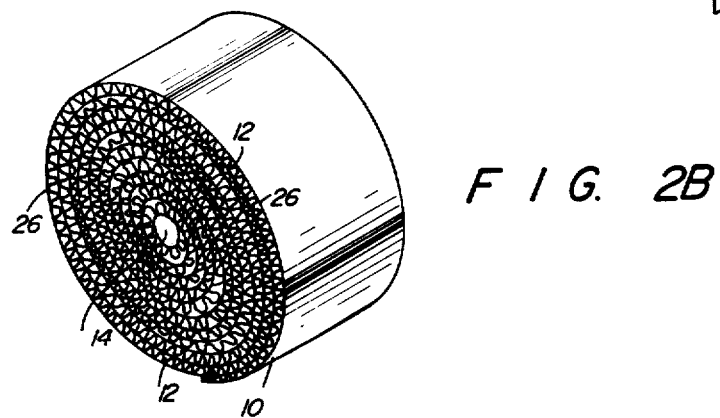
F I G. 2B
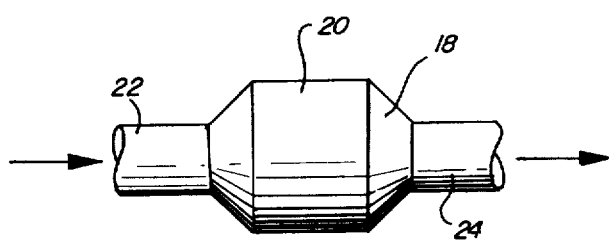
F I G. 2C

POROUS METAL-ALUMINA COMPOSITE

This application is a division of our prior U.S. application Ser. No. 698,030, filing date June 2, 1976, now U.S. Pat. No. 4,058,485, which is a continuation of application Ser. No. 536,646, filing date Dec. 26, 1974, now abandoned.

BACKGROUND

Porous metal structures, ceramic monoliths and the so-called cermets, that is, composites of ceramic and metal materials, have been known for many years. These materials have been useful because of their inherent catalytic properties as well as their ability to serve as catalyst support structures; for example, porous nickel sheets have been used in battery electrodes, particularly as components in fuel cell electrodes, while ceramic and cermet materials have been used as supports for metals and metal oxides which are active as catalysts in chemical reactions. In recent years there has been increasing interest in the use of ceramic and cermet materials as supports for catalytic materials used in treating automobile exhaust emissions. See for example U.S. Pat. No. 3,444,925 to Johnson which discloses ceramic and cermet honeycomb structures and their use in automobile exhaust gas catalytic converters; U.S. Pat. No. 3,492,098 to De Palma et al. in which a multi-layer structure, which includes a ceramic layer and an alumina layer, is used as a support for a third layer of catalyst; and U.S. Pat. Nos. 3,471,413 and 3,492,148 both to Hervet which also disclose multi-layer structures including a porcelain layer, an alumina layer and a catalyst layer.

The ideal catalyst support should combine physical strength, high porosity to permit rapid fluid transport to and out of the support, a high surface area on which catalytic materials can be deposited and ability to withstand elevated operating temperatures. The porous catalyst supports heretofore known have often been satisfactory as to some of these properties, but none of the catalyst supports heretofore known have been totally satisfactory for uses under stringent operating conditions, for example, in auto exhaust catalytic converters.

The present invention provides an improved porous composite structure which exhibits all of the aforementioned desirable properties of strength, internal porosity, high surface area and ability to withstand elevated temperature service.

IN THE DRAWINGS

FIG. 1 is a graph showing the effect of heating time and heating temperature on the surface area of alumina.

FIG. 2 shows a typical exhaust gas catalytic converter which employes the composite structure of this invention.

SUMMARY OF THE INVENTION

Figure 3A:
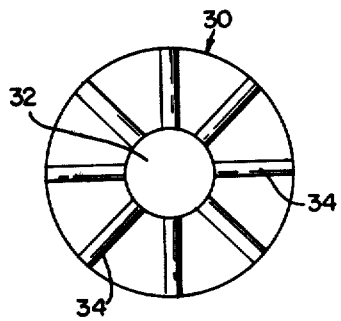
FIG. 3 shows another exhaust gas catalytic converter structure which employs the composite structure of this invention.

The present invention includes a porous composite structure comprising a sintered mixture of metal particles and alumina particles characterized by the following parameters: (a) at least 50 weight percent of the particles in the composite are metal particles; (b) at least 5 weight percent of the particles in the composite are alumina particles having a surface area of at least 25 square meters per gram; and (c) the inter-particle porosity in the composite structure is between 5 volume percent and 60 volume percent. In a preferred embodiment particularly useful as a catalyst support, the inter-particle porosity is at least 15 volume percent. In another preferred embodiment, a metal screen, grid, mesh or perforated metal sheet is used to give the composite structure additional mechanical strength.

The invention also includes a method for producing a porous sintered mixture of metal particles and alumina particles comprising the steps of: (1) forming a mixture of (i) particles of a metal having a sintering temperature below the phase transition temperature for the formation of alpha-alumina and (ii) transition alumina particles having a surface area sufficiently high so that they will retain a surface area of at least 25 square meters per gram after sintering of the metal particles pursuant to step (3) below, such mixture containing at least 50 weight percent metal particles and at least 5 weight percent (on an anhydrous basis) transition alumina particles; (2) compacting the mixture into a desired shape under a pressure high enough so that the compacted mixture will retain its shape, but low enough so that the mixture after sintering will have an inter-particle porosity of at least 5 volume percent; and (3) heating the compacted mixture to a temperature below the phase transition temperature of transition alumina to alpha-alumina for a sufficient length of time to cause sintering of the metal particles.

DETAILED DESCRIPTION

As used herein, the term "intra-particle porosity" means the volume percent of void space within an individual particle, and the term "inter-particle porosity" means the volume percent of void space within a given volume of the sintered composite structure of the invention. Inter-particle porosity does not include the intra-particle porosity of particles within the given volume of the composite structure. Both intra- and inter-particle porosity can be measured by the methods described in "Adsorption, Surface Area and Porosity", by S. J. Gregg and K. S. W. Sing, Academic Press, New York, 1967.

As used herein, the term "transition alumina" means the substantially anhydrous form of the aluminum oxide obtained by heating an aluminum oxide hydrate to temperatures above about 500° C. Aluminum oxide hydrates and transition aluminas are described in detail in Kirk-Othmer's Encyclopedia of Chemical Technology, 2nd Edition, Vol. 2, pp. 42–50, 1963.

As used herein, the term "sintering" means the bonding together at temperatures below their melting temperatures of a sufficient number of particles in a particulate mass to impart three-dimensional structural coherence to the mass.

As used herein, the term "scaling" means the susceptibility of a metal to change weight in a corrosive atmosphere and is a measure of oxidation resistance, while the term "scaling temperature" means the temperature below which the rate of oxidation is less than 0.002 $gm/in^2/hr$, as specified in "Corrosion Engineering", by M. G. Fontana and N. D. Green, McGraw-Hill, New York, 1967, page 369.

The composite of this invention is a porous composite body of metal and high surface area alumina. The composite is formed by blending metal particles and alumina particles into a uniform mixture, compacting the mixture at ambient temperatures, and then sintering the green substrate in a reducing atmosphere for specified times and temperatures. The resulting porous composite structure is a mechanically tough, porous, high surface area material.

A principal use of the porous composite structure of this invention is as a catalyst support substrate, and the following discussion includes a detailed description of such use with particular reference to use in apparatus designed to reduce pollutant emissions from automobile engines.

The typical automobile equipped with an internal combustion (IC) engine emits an exhaust gas that contains three pollutants; unburned hydrocarbons (HC), carbon monoxide (CO), and nitrogen oxides ($NO_x$). The Environmental Protection Agency (EPA) has set maximum limits for these pollutants that will have to be met by new automobiles within the next few years.

One promising way of meeting the new standards is through the use of catalytic converters, that is, devices which convert the pollutants in automobile exhaust into relatively harmless substances. To react the HC and CO pollutants to the end products of carbon dioxide and water, it is necessary to maintain an oxidizing atmosphere, whereas to react the nitrogen oxides to nitrogen, it is advantageous to maintain a reducing atmosphere. Further, in order to economically perform the reactions at the temperatures that normally exist in the auto exhaust system, it is necessary to utilize catalysts to increase the desirable reactions rates. Since the desirable conditions for the pollutants are different, it has been proposed that the post-treatment of the exhaust gases be performed in two stages. The first stage would catalytically react the $NO_x$ to $N_2$, whereas the second stage would react an auxiliary air stream and the HC and CO pollutants. Such a two-stage system would take maximum advantage of desirable equilibrium conditions for the reactions, that is, for the $NO_x$ conversion, a predominantly reducing atmosphere and possibly lower temperatures, and, for the HC and CO conversion, relatively high temperatures and an oxidizing atmosphere. By maintaining more favorable conditions for each stage, it is easier to find suitable catalysts for each reaction that will increase the overall reaction rates to the necessary levels. It is evident that a single stage system to treat all three major pollutants could be used if suitable catalysts becomes readily available.

For all reactions aided by catalysts, it is necessary that the reactant fluids be brought into contact with one another in the presence of the catalyst. Only then can the catalyst perform its functions of increasing the reactant kinetics. To prevent mass transfer limitation, it is desirable to distribute the active catalyst over a wide surface area to aid reactant fluid contact. Although it is possible for the catalyst itself to be its own support, this is not usually the case, due to different desirable properties for the catalyst and catalyst support and due to the higher cost of most catalysts compared to catalyst support materials. The above-described catalytic converters for control of auto exhaust emissions can advantageously use a catalyst support composed of metal and transition alumina that is an embodiment of this invention. The catalyst support has the desirable features of high specific surface area, good temperature resistance, and good mechanical strength.

Each of the two components of the catalyst support substrate of this invention has a definite purpose and must meet the requirements for that purpose. The metal component of the substrate is primarily intended to impart mechanical strength to the substrate, whereas the alumina component is primarily intended to supply the high surface area for the catalyst. The entire structure must be sufficiently porous to allow fluid transfer within the substrate and the entire structure must be serviceable at operating temperatures in an operating atmosphere.

The mechanical strength required for the catalyst support structure is primarily good vibration and impact strength, with some tensile strength. The first two criteria are especially valuable for automotive applications and somewhat less important for stationary applications. The tensile strength factor is an additional measure of the durability of the composite, in that it gives an indication of the ability of the composite to resist factors such as fluid erosion and fluid pressure loads. The degree to which the above-described properties are required depends to some extent on the physical form of the substrate, for example, flat sheets, wound sheets, pellets and the like.

The metal component of the substrate must supply the mechanical strength to the substrate and be able to maintain that strength at service conditions. For the auto emission control application, this means that the metal must be able to withstand frequent and repetitive applications of high service temperatures and oxidizing (and/or reducing) atmospheres that contain water vapor. The ability to retain strength at high temperatures is important because operation of the catalytic converter at higher temperatures aids the performance of the catalyst and results in the overall system being more competitive. That is, the performance of the catalytic converter is the combined result of the conversion that would be obtained at the given temperature without the catalyst and the additional conversion due to catalytic action. Thus, if the system has the capability of operating at higher steady-state temperatures, the overall performance of the system would be enhanced. Additionally, the metal should be able to withstand high service temperatures for relatively short durations that may result from temporary upsets of the system. For the auto catalytic converter, the expected steady-state operating temperatures are about 315° to 650° C. with possible short-term (less than 5 minutes) temperature excursions to 1100° C., depending, of course, on the type of engine, fuel, and engine efficiency. Accordingly, the metal component of the catalyst support substrate should be acceptable for those temperature ranges.

The various metal powders differ in their resistance to scaling at elevated temperatures as illustrated in the following Table 1. The scaling temperatures for four different metals are listed in Table 1, the data being obtained from Fontana, M. G. and Greene, N. D., *Corrosion Engineering,* McGraw-Hill, New York, 1967, page 369.

Table 1

| Metal | Scaling Temperature (°C.) |
|---|---|
| 310 Stainless Steel | 1149 |
| 304 Stainless Steel | 899 |
| Nickel | 788 |
| 1010 Carbon Steel | 482 |

It should be noted that the metal component imparts good thermal shock resistance to the substrate. This factor is important in the cyclical temperature environment of the automotive application and would favorably influence the operating life of the composite structure. This is a definite advantage of the metal-alumina composite structure compared to the all-ceramic system which would have lower resistance to thermal shock.

Another factor that determines the serviceability of the metal in the catalyst support substrate is its resistance to the oxidizing (or reducing) atmosphere present in the second (first) stage of the auto catalytic converter. The second stage of a catalytic converter is often exposed to an auxiliary air supply (excess oxygen) and the highest temperatures in the system (up to 650° C.), and is therefore a relatively severe service condition.

It is evident from the above discussion that two factors that determine the suitability of a metal for use in the catalyst support substrate is its service temperature and resistance to oxidizing (or reducing) atmospheres. Additionally, a third factor is the ability of the metal to be sintered at relatively low temperatures (less than about 1050° C.). This factor is related to the susceptibility of the high surface area alumina component to high temperatures. As will be discussed in more detail hereinbelow, transition alumina loses surface area upon exposure to high temperature.

Based on the above-described factors, suitable metals and metal alloys for the catalyst support substrate include chromium, copper, cobalt, nickel alloys, iron alloys, Monel (67 Ni, 30 Cu, 1.4 Fe), Inconel (79.5 Ni, 13 Cr, 6.5 Fe), Stainless Steel 304 (19 Cr, 9.5 Ni, Fe), Nichrome (80 Ni, 20 Cr), Stainless Steel 310L (25 Cr, 20.5 Ni, Fe), 6% Al-Fe (6 Al, Fe), and the like. The above list is only representative of suitable metal components for the catalyst support substrate and other metals can be suitable, particularly where the catalyst support substrate is to be used for applications other than the catalytic converter for auto emission control so that service conditions are less severe.

The primary purpose of the alumina component in the catalyst support substrate is to supply a large surface area for catalyst deposition. The alumina component supplies relatively little mechanical strength to the substrate, but it has good resistance to the system atmosphere. An especially suitable type of alumina for the catalyst support substrate are the forms of aluminum oxide known as the transition-alumina. The terminology associated with various forms of alumina has not been entirely consistent. Accordingly, the following description of the preparation and properties of transition-alumina is based on the Kirk-Othmer reference cited hereinabove. Typically, a transition alumina can be formed by starting with the gel-type alpha monohydrate (gel-Boehmite) formed and then heating it to drive off the water. Alumina gels lose their water of constitution progressively on heating from about 150° C. upwards, but the last few percent is not eliminated until about 500° C. The resulting transition alumina has a relatively high internal porosity (about 50 volume %) and pore diameters (about 50 to 100 Angstroms) that results in large internal surface area ranging from 200 to 400 m²/gm which, even after heating in the process of this invention retains a substantial internal surface area available for catalyst deposition and a pore structure that offers relatively little resistance to mass transfer. Such materials are highly desirable for use in the process of this invention in that they allow the ready diffusion of reactants into the structure and permit good utilization of the internal area. Transition alumina is susceptible to temperature and undergoes a phase transition at about 1150° C. into the alpha-alumina or corundum form. The alpha-alumina form is a relatively dense (less than 1% porosity) material that has very low internal surface area (less than 1 m²/gm). The properties of the alpha-alumina are thus undesirable as a catalyst support.

Accordingly, it can be seen that the expected exposure temperature for the catalyst support substrate, both during sintering and subsequent use, is important to avoid conversion of the transition alumina into the corundum form, the primary drawback of this conversion being the loss of alumina surface area. The effects of heating and of this conversion are shown in FIG. 1.

FIG. 1 shows the reduction in available surface area as a function of heating time at various temperatures for a typical commercial grade transition alumina having a surface area of 322 m²/gm prior to heating. Samples of the alumina were heated in air at the temperatures and for the time periods shown by the data points set forth in FIG. 1, and the surface area was measured after cooling the samples to room temperature. Smooth curves were then drawn through the data points; curve A shows the change in surface area upon heating for 15 minutes, curve B for heating over a period of 1 to 4 hours and curve C for 18 hours of heating. As can be seen from FIG. 1, the effective surface area of the alumina is sharply reduced by extended heating at temperatures approaching the phase transition temperature (1150° C.) from transition alumina to alpha-alumina. These data also show that where sintering temperatures for formation of the porous composite material and its surface temperature in actual use are below about 1050° C., a relatively high surface area is retained even upon extended periods of heating. Some loss of alumina surface area during sintering and subsequent use at elevated temperatures is unavoidable. However, the retained surface area of the substrate of this invention is high relative to prior art structures and is readily accessible because of the ease of mass transfer throughout the substrate.

A number of transition alumina materials are commercially available. The composition and properties of two typical transition aluminas are set forth in Table 2.

Table 2

| Chemical Analysis, % | Alumina #1 | Alumina #2 |
|---|---|---|
| Al₂O₃ | 85 | 69.7 |
| SiO₂ | 5.8 | 5.7 |
| Na₂O | 2.0 | 0.04 |
| Fe₂O₃ | 0.10 | 0.02 |
| Ignition Loss (H₂O) | 6.0 | 23.8 |
| Surface Area m²/gm (ambient) | 350 | 239 |
| Pore Volume (ml/gm) | 0.5 | 0.3 |
| Pore Diameter (A°) | 60 | — |

Many transition aluminas, such as those of Table 2, contain a few percent silica which is in no way detrimental in the process or composite of this invention. Transition alumina with high surface area such as those shown in Table 2 are preferred; however, any transition alumina material can be used in the practice of this invention so long as it has an initial surface area sufficiently high to retain a final surface area after sintering of at least 25 m²/gm, and preferably at least 50 m²/gm. As a general rule, the surface area of the transition alumina prior to sintering should be at least 200 m²/gm. Surface area measures can be made by conventional adsorption techniques; for example, that described in Gregg, S. J. and Sing, K. S. W., "Adsorption, Surface Area, and Porosity", Academic Press, 1967, New York, page 49.

In addition to silica, the alumina component of this invention can contain, or can be mixed with, other metal oxides which are inert or contribute to the total catalytic activity of the composite structure. For example, if the alumina is treated with catalyst prior to sintering (a procedure described in detail herein below), the alumina may contain up to a few percent by weight of oxides of the catalytic metals. Alternatively, the alumina can be mixed up to 5% to 45% by weight of inert metal oxides such as silica or zirconia. These inert additions are not detrimental to the composite structures of this invention so long as the sintered composite contains at least 5 weight percent alumina particles having a surface area of at least 25 square meters per gram.

A potential problem encountered with the composite structures of this invention is that of maintaining high catalytic activity of loaded substrates upon extended exposure to automotive exhaust conditions. The loaded substrates exhibit high initial activity, but tend to degrade during service. It has been discovered, however, that pretreating the alumina component under severe conditions of heat and moisture substantially eliminates the problem and results in a reactor having high stable activity.

A typical silica-stabilized transition alumina has, in the as-received condition, a surface area of 272 m²/gm. After the pretreatment procedure described below, the surface area is typically reduced to about 150-170 m²/gm. However this remaining surface area is stable; exposure of the pretreated alumina to sintering and/or service conditions does not produce significant continued degradation.

Pretreatment for automobile exhaust service consists of subjecting the alumina to a temperature of 866°–927° C. in an atmosphere containing 10–15% water for 16–24 hours. These conditions are more severe than those normally encountered in automotive exhaust service.

One suitable pretreatment procedure consists of two steps: first, heating the alumina in hydrogen at 927° C. for 3 hours and second, reheating in hydrogen plus 10% water at 866° C. overnight. The following surface area measurements show the result:

| Alumina | Surface Area As received, m²/gm | Surface Area After First Step m²/gm | Surface Area After Second Step m²/gm |
| --- | --- | --- | --- |
| #2 of Table 2 | 272 | 181 | 161 |
| #1 of Table 2 | — | 184 | 133 |

In a modified procedure, satisfactory results are obtained by substituting nitrogen for hydrogen. In one series of tests on the silica-stabilized alumina (#2 of Table 2), the first step using hydrogen as described above was retained, but nitrogen was substituted in the second step. In order to confirm that the surface area was stable, the second step was repeated twice (3 steaming steps in all), each lasting 16 hours. Surface area measurements were as follows:

| Operation | Subsequent Surface Area, m²/gm |
| --- | --- |
| As received | about 272 |
| 3 hrs. at 927° C. in H₂ | 181 |
| 16 hrs. at 871° C. in N₂ + 10–15% H₂O | 162 |
| 16 hrs. at 871° in N₂ + 10–15% H₂O | 152 |
| 16 hrs. at 871° C. in N₂ + 10–15% H₂O | 147 |

The two additional steaming operations caused only about 9% additional surface area reduction which is not considered significant. One period of steaming is sufficient.

In a further modification, the two-step procedure can be combined in one step consisting of 24 hours heating at 927° C. in $N_2 + 10-15\%$ $H_2O$. Final stabilized surface area was 156 m²/gm (initial surface area 272 m²/gm).

Pre-treatment temperatures of 866° to 927° C. were selected for alumina to be used in automotive exhaust service because such condition is at least as severe as that expected in actual service. Where the composite structure is to be used in less severe service, for example, in stack gas purification, lower pre-treatment temperatures can be used, which results in somewhat higher stabilized surface areas.

An atmosphere containing air or oxygen can also be used in the pre-treatment procedure. However, inert gases such as hydrogen and nitrogen are preferred to prevent oxidation damage to metal furnace components.

In summary, the pre-treatment method of this invention comprises contacting transition alumina with water vapor at elevated temperatures for a period of at least three hours, the elevated temperature being at least as high as the temperature at which the composite structure of this invention is expected to be subjected during its intended use. Temperatures in the range of 600° C. to 1000° C. are generally satisfactory and do not result in undesirable loss of surface area. Where the substrate is intended for use in automobile exhaust service, pre-treatment temperatures in the range of 800° C. to 1000° C. are preferred.

It is generally easier to carry out the pre-treatment method of this invention on the transition alumina before it is incorporated into the sintered composite structure. However, the pre-treatment can be carried out on a finished composite structure after sintering with substantially the same results.

The pre-treatment of the alumina should be completed before loading a catalyst thereon. If the alumina is first catalized and then pre-treated, some of the pre-deposited catalyst is encapsulated or entrapped or otherwise loses it activity. When the alumina is first pre-treated, the catalyst is then applied to the stabilized surface of the alumina and remains freely accessible and active.

Although the above discussion has outlined the required characteristics of the metal and alumina components to be used in preparing the catalyst support substrate, there are certain additional factors which must be considered in order to obtain the most effective catalyst support substrate material. Mechanical tests have shown that at least 50 weight percent of the above-described metal component should be present for good mechanical strength. As can be seen in Table 3, the use of all metal leads to a very high strength, whereas high alumina is very low strength. It is necessary to have sufficient metal component to provide at least partially continuous frameworks which result in good mechanical strength for the substrate. Experimental testing of two typical metal component and transition alumina substrates has indicated that the substrate strength and ductility are inadequate below about 50 wt. % of metal component. Such weak substrates would have relatively low resistance of fluid erosion and vibration loads that characterize severe substrate applications such as automobile catalytic converters.

Table 3

The porous sintered composites tested were prepared by mixing nickel and transition alumina powders (both minus 325 mesh), compacting the mixture into flat sheets 1.27 cm. × 5.08 cm. × 0.5 mm. followed by sintering in a hydrogen atmosphere for 6 hours at 870° C. The tensile strength measurements were made by suspending a weight pan from each of the flat sheets and progressively adding weights until breakage occurred.

| Wt.-% Metal | Tensile Strength (kg/cm$^2$) |
|---|---|
| 50 | 67 |
| 75 | 120 |
| 90 | 239 |
| 100 | 3818 |

Calculations and tests have shown that a catalyst support substrate should preferably contain at least 10 weight percent transition alumina component. This quantity is based on the requirement of sufficient surface area in the substrate to support the active catalyst, and is of course related to the available surface area of the transition alumina, since less of a high surface area material will supply the same total surface area within the substrate that would be available from a larger quantity of lower surface area transition alumina. Additionally, the weight limit of transition alumina (and thereby a significant portion of the total available surface area) in the substrate is related to the expected activity of the catalyst that will be used with the catalyst support. With a high-activity catalyst (such as the noble metals, platinum or palladium), less catalyst will be required than with relatively low-activity catalysts (such as oxides of the base metals such as, $Cr_2O_3$, CuO, MnO, either alone or doped with trace quantities of the noble metals), for similar improvements in reaction rates. For equivalent distribution of the catalyst on the catalyst support surface, it is evident that systems that require more catalyst will require more surface area. These different requirements for diverse catalysts can be accommodated by varying the quantity of transition alumina in the catalyst support substrate. At least 5 weight percent transition alumina is required in the substrate in order to provide adequate surface area regardless of the activity of the catalyst component. For only moderately active catalysts at least 10 weight percent transition alumina and preferably 30 weight percent transition alumina should be included in the substrate.

As mentioned previously, one factor that is a variable in the manufacture of the catalyst support substrate are the sintering conditions. The sintering operation can be carried out in vacuum or in any atmosphere which does not react unfavorably with the substrate components or catalytic components, and an inert or reducing atmosphere is preferred. Hydrogen provides a convenient reducing atmosphere, while the noble gases such as argon and neon provide convenient inert atmospheres. Nitrogen gas also provides a non-reactive atmosphere with many substrate systems. The sintering temperatures and heating times are also variable. Tests were performed on a nickel-transition alumina system and are shown in Table 4. The sample preparation and tensile strength tests were carried out in the same manner as described in connection with Table 3 hereinabove, except for the different combinations of heating temperature and duration shown in Table 4. The data in Table 4 illustrate the typical effect of sintering temperature and time on the tensile strength of porous composite structures of this invention.

It should be noted that, at similar conditions, the thicker specimens (0.5 mm) exhibited better tensile strength than the thinner (0.23 mm) specimens.

Table 4

| System | Nickel-Transition Alumina | | | | | | | |
|---|---|---|---|---|---|---|---|---|
| Specimen Size | 1.27 cm. × 5.08 cm. × 0.23 mm. | | | | 1.27 cm. × 5.08 cm. × 0.5 mm. | | | |
| Metal Content (wt-%) | 100 | 90 | 75 | 50 | 100 | 90 | 75 | 50 |
| Sintering Condition | | | | | | | | |
| Temperature (°C.) / Time (Hr.) | Tensile Strength (kg/cm$^2$) | | | | Tensile Strength (kg/cm$^2$) | | | |
| 871 / 1 | 3340 | 105 | 108 | Brittle | — | — | — | — |
| 871 / 6 | 3818 | 239 | 120 | 67 | — | — | — | — |
| 927 / 1 | 3178 | 433 | 96 | 92 | — | 313 | 218 | 136 |
| 982 / 1 | 3340 | 262 | 127 | 123 | — | 823 | 276 | 227 |
| 982 / 6 | — | — | — | — | — | 928 | 513 | 205 |
| 1093 / 1 | 3670 | 527 | 137 | 101 | — | 752 | 347 | 267 |

In general, higher temperatures and longer exposure times are favorable to high substrate strength as shown by tensile tests. Further, to some extent, the effects of sintering temperature and time involve a trade-off in that combinations of higher temperatures and shorter time periods are equivalent to lower temperatures and longer exposure times. From a mechanical strength standpoint, high temperatures and long exposure times are most desirable. However, from the standpoint of preservation of the surface area of the transition alumina, low temperatures and short exposure times are best. The opposing criteria require a compromise that can be easily experimentally determined by a short series of tests such as those of Table 4 for each metal powder-transition alumina powder system. For example, it has been found that sintering conditions of 870° C. at 6 hours is favorable for the nickel-transition alumina system and 925° C. at 3 hours is favorable for the Stainless Steel 310-transition alumina system.

The sintering operation should be carried out at low enough temperatures and/or short enough periods of time so that the metal particles do not fuse together, as opposed to sintering. Fusion causes the open matrix to contract and reduces the size of the openings and channels in the porous structure with a resulting increase in density, a decrease in porosity, and a decrease in the ease of a fluid mass transfer. When a composite containing about 50 weight percent metal particles is properly sintered as described above, the metal particles will comprise only about 20 percent of the total volume of the completed substrate.

Another factor that needs to be considered in the makeup of the catalyst support substrate is the inter-particle porosity of the substrate. The intra-particle porosity of the transition alumina is about 40–70%, whereas the intra-particle porosity of the metal component is negligible. This is satisfactory and desirable since the metal particle is intended to add strength, whereas the transition alumina particle is intended to add surface area. Once the reactant fluids are present at the outer boundary of the transition alumina particle, the internal porosity allows satisfactory mass transfer within the pores to reach the active catalyst on the internal surface area. However, it is evident that for a uniform catalyst support substrate, not all transition alumina particles will be at the outer boundary and in direct contact with the reactant fluids. In order for transition alumina particles of the support substrate to be active throughout the entire depth of practical thicknesses, it must be possible for the reaction system fluids (both reactants and products) to be able to be transferred through the substrate. It is a very desirable characteristic of the composites of the invention that the catalyst support substrate has substantial inter-particle voids or porosity to allow for fluid transfer, in contrast to many known substrates which relied upon a single particle thickness (often referred to as a "wash coat") of high surface area alumina on a relatively non-porous support. On the basis of calculations and tests, it has been found that the inter-particle voids or porosity should be at least 5% and more preferably at least 15 vol. %. The higher the porosity, the easier it is to transfer fluids within the substrate and greater thickness of the substrate can be effective catalyst supports. However, the more porous substrates tend to have lower mechanical strength, and their gross void space also constitutes more of the total composite volume which could otherwise be occupied by catalysts or reaction-promoting material. Accordingly, a compromise must be made between the two requirements. It has been found that about 25 vol. % inter-particle porosity represents an effective compromise for many systems.

For a reasonable approximation of inter-particle porosity, the density of the metal particles can be assumed to be that of solid base metal and that of the transition alumina particles, a value characteristic of the specific alumina employed. Knowing these densities, the volume occupied by each component can be determined from the known weight of each component in the finished substrate. If the volume of the finished substrate is $V_s$, then the inter-particle porosity $\epsilon$ is $$\epsilon = \frac{V_s - (V_M + V_A)}{V_s}$$

where $V_M$ and $V_A$ are metal and alumina volumes, respectively.

For a more broadly-applicable determination of inter-particle porosity one may employ the well-known Mercury-displacement porosimeter test, wherein the quantity of Hg capable of being held within the sintered matrix is found from the net displacement of Hg by an immersed sample of the matrix. The test should be conducted under substantial pressure, e.g. 2500 psi in order to compress entrapped gases to a negligible volume.

The optimum substrate porosity is related to the particular reaction system and catalyst effectiveness. The reaction mechanism with a catalyst is a series process. First, the reactants must be transported (by gas phase diffusion in the auto emission case) to the surface containing the active catalyst. Secondly, the reaction takes place, and thirdly, the products are transported (again by diffusion) back to the bulk fluid stream. The overall process rate is controlled by the rate of the slowest step. The ideal catalyst support substrate is one which has mass transfer characteristics such that the resistance to fluid transfer to inner pores containing catalyst is low and thereby the catalytic reaction step is rate-controlling. This can be more closely approached with sufficient porosity in the substrate to allow easy transfer of fluids, generally, at least 5 vol. % inter-particle porosity. The lower values will tend to be satisfactory for slow reactions, such as removal of sulfur from flue gases by an acceptor process, whereas, the higher porosity is desirable for fast reactions such as the oxidation of hydrocarbons or carbon monoxide in auto emission control. Additionally, it should be noted that the required substrate porosity is related to the substrate thickness. If it is desired to use thick, relatively massive substrates (as in pellet or other form, such as flat plates), the required porosity will be higher than if the substrate is used in thinner sections. This inter-relationship can be seen from the following simplified equation for steady-state gas phase diffusion.

$$\frac{N}{A} \propto \epsilon \, Dg \left( \frac{\Delta C}{\Delta X} \right)$$

where
  N—gas transferred, gm. moles/hr.
  A—surface area, cm$^2$
  $\epsilon$—inter-particle porosity, expressed as fraction of surface area available for gas transfer
  Dg—gas phase diffusion coefficient, cm$^2$/hr.
  $\Delta$C—concentration driving force for gas transfer, gm. moles/cm$^3$
  $\Delta X'$—substrate thickness through which gas must be transferred to reach the alumina, cm.

The substrate thickness (i.e., pellet diameter for packed catalyst beds) will depend upon the various significant system design requirements, such as pressure drop, mass transfer, reaction rate, and required mechanical strength. In some severe applications mass transfer requirements may dictate a thin cross-section.

The composite structure porosity is basically related to component particle size and compaction pressure. If rigid spheres are uniformly packed, the arrangement has a calculable porosity. However, the metal and transition alumina particles are not regular rigid spheres. Instead, they are powders that have at least one dimension less than a certain size as determined by grading through standard sieves. Further, the transition alumina particles are weaker than the metal particles and upon compaction, the transition alumina particles will crush and subdivide. Also, since the particles are non-uniform, gravity settling will result in a certain porosity that can be reduced by compaction of the uniform blend of the two-component system. Initial compaction will break and crush the particle edges, whereas continued compaction will crush and subdivide transition alumina particles. The resultant inter-particle porosity of the system is determined both by initial particle size and compaction conditions. As a general rule for a given compaction pressure, the inter-particle porosity decreases with decreasing particle size only if the compaction pressure is less than the crush strength of the transition alumina particles.

An additional factor that must be considered for some applications of the composite of the invention as a catalyst support substrate is the specific heat capacity of the composite. For those applications that are intermittent, such as for auto emission control, the catalytic converter system undergoes a warmup period prior to its effective operation. Obviously, the warmup period is not as effective in terms of the desired reaction as the steady-state hot condition. For these reasons, the catalyst support substrate should have a relatively low heat capacity so that its heats up quickly during start-up. The warmup characteristics of the catalyst support substrate are illustrated for the automotive catalytic converter in Table 5. The all-alumina system of Table 5 contained two forms of alumina; the structural framework composed primarily of alpha-alumina and a layer of transition alumina which would serve as porous catalyst support. The nickel transition alumina composite included a reinforcing screen which will be described in more detail hereinbelow.

Table 5

| System | All-Alumina | Nickel-Alumina Composite |
| --- | --- | --- |
| Cylindrical Monolith Dimension (888 cm$^3$ Volume) | 7.6 cm Length × 12.2 cm Diameter | 7.6 cm Length × 12.2 cm Diameter |
| Component Weight (gm) | | |
| Transition Alumina | 50 | 150 |
| Structural Alumina | 450 | — |
| Metal Powder | — | 350 |
| Screen | — | 350 |
| Total Weight (gm) | 500 | 850 |
| Monolith Density (gm/cm$^3$) | 0.56 | 0.96 |
| Monolith Primary Area (m$^2$/m$^3$) | 3149 | 1050 |
| Monolith Heat Capacity, (20° C.), cal/gm/°C. | 0.18 | 0.123 |
| Monolith Volumetric Heat Capacity, cal/cm$^3$ converter/°C. | 0.10 | 0.12 |
| Monolith Heat Capacity Based on Transition Alumina, cal/gm/°C. | 57.5 | 22.3 |

From the comparison to the all-alumina monolith shown in Table 5, it can be seen that the volumetric heat capacity (cal/cm$^3$ converter/°C.) is about the same (alumina is 0.10, nickel-alumina composite is 0.12), but that the heat capacity based on the contained transition alumina (cal/gm transition alumina/°C., i.e., based on the available area for catalyst deposition) is considerably better (alumina is 57.5, nickel-alumina composite is 22.3). The very high density of the metal component is essentially compensated for (relative to alumina) by its lower specific heat capacity so that the all-alumina and metal-alumina composite volumetric heat capacity are approximately equivalent. However, the nickel-transition alumina structure contained three times as much active catalyst support (transition alumina) as did the all-alumina structure of the same dimensions. Accordingly, for the same required area for catalyst deposition, the composite material monolith requires less volume and thereby has better warmup characteristics. It should be understood that the low heat capacity requirement is important only for intermittent systems and would not be important for primarily steady-state operations. Also, the fact that the primary surface area of the nickel-alumina substrate of this invention is considerably less than that of the all-alumina substrate reflects the easy accessibility of a large intra-pore volume of the former due to its substantial, open inter-pore system.

In a preferred embodiment of the invention, a metal screen, grid, mesh or perforated metal sheet is used to give the composite structure additional mechanical strength. (The screen, grid, mesh or perforated metal sheet materials will hereinafter be referred to generically as "screen.") The mixture of metal and transition alumina powders are spread over and compacted into the screen prior to sintering and the sintering step causes direct bonding of the metal component to the screen. The result is an extremely strong porous composite material. The screen imparts considerable additional strength and flexibility to the composite that makes it very resistive to mechanical loads such as vibration, and the relative ductility of the composite makes it possible to form the material into desirable structures, such as those described later with reference to FIGS. 2 and 3. While the non-reinforced catalyst support substrate is ideally suited for forming into pellets for use in packed beds, the screen reinforced substrate is ideally suited for forming into flat, relatively thin sheets for use in various stacked or woven structures.

It is important to note that for the automobile exhaust catalyst embodiment the catalyst support substrate is primarily compacted into the screen between the wire grid. That is, the substrate is not just a coating on the screen, and the thickness of compacted substrate does not substantially exceed the screen thickness. That arrangement results in a very effective and strong catalyst support system. Essentially, each unit of substrate within the screen grid is an independent unit and individually supported on all four sides. This leads to a very flexible structure that can be easily formed and has extremely good resistance to mechanical loads and thermal shock. Substantially all the substrate within the grid support is active as a catalyst support (as opposed to primary area surface only coatings) and leads to a system that has a high surface area per unit volume.

The thickness of the sintered screen reinforced catalyst support substrate system will be about twice the final (after compaction) cross-sectional dimension of the screen wire, since the limiting element during compaction will be the screen wire overlays. This does mean that the substrate thickness will exceed the wire diameter in certain regions of the grid but only by about the wire dimension. Further, in most regions, the "excess" substrate thickness is distributed on both sides of the screen wire, leading to a very effective support structure in which each element of catalyst support substrate is essentially independently supported by the surrounding screen wires. There is relatively little interaction between adjacent elements as a result of portions of substrate which overlap the screen wire. This would not be the case if the screen reinforced system was substantially thicker than twice the wire diameter. An ideal screen support would be a grid formed of circular wires all in the same plane, but the woven screen is a more practical and economical version of the ideal support structure.

As catalyst support systems for use in auto emission control, the screen reinforced substrate systems should preferably be between about 0.25 and 1.25 mm thick (and most preferably not greater than 0.75 mm thick) with corresponding wire mesh diameters of about 0.125 to 0.625 mm. The grid openings of the wire mesh should preferably be about 0.50 to 2.5 mm, respectively. The preferred dimensions reflect the fact that thicker substrate systems tend to lose ductility and are not as effective in auto emission control service from the standpoint of utilization of the catalyst on all of the supporting alumina (particularly the particles within the inner regions of the substrate), while substrates thinner than the preferred dimensions make monolith structures unduly complex and costly due to the need for supplying, adequately supporting, and spacing a relatively larger number of layers in a monolith in order to provide the required amount of catalyst per unit volume. The preferred dimensions for catalyst support systems for use in services other than auto emission control, of course, vary widely depending on the application, but the preferred dimensions for each type of service can be easily determined according to standard engineering practices. Suitable wire screen materials are the same as those that satisfy the criteria described hereinabove for the metal component of the non-reinforced substrate.

A factor to be considered in the formation of the catalyst support substrate is the compaction pressure. In general, the higher the compaction pressure on the mixed powder components, the higher will be the tensile strength of the sintered substrate. However, greater compaction pressure reduces inter-particle porosity so that the degree of compaction must be chosen to accommodate both strength and porosity requirements. Tests were conducted with substrates prepared with 70%—310 stainless steel powder and 30% transition alumina, and without reinforcement. Specimens compacted to 2800 kg/cm$^2$ averaged 375 psi (26 kg/cm$^2$) ultimate tensile strength, while those compacted to 5600 kg/cm$^2$ averaged 740 psi (52 kg/cm$^2$) tensile strength. Whereas strength and porosity requirements may vary among specific applications, compaction to about 5600 kg/cm$^2$ has been found to provide an effective balance between those two factors for most uses of the 70/30 stainless steel/alumina substrate.

The preferred range of compaction pressures will of course vary with factors such as the specific metal or metals employed, the ratio of metal-to-alumina, and the use of other components such as transition metal oxides. Another factor is the optional use of a vehicle or lubricant for the particles, for example, water or methanol. If desired, a plastic binder dissolved in a suitable solvent may be employed, for example, an isobutylene polymer with molecular weight of about 140,000 (commercially available under the name Vistanex) dissolved in kerosene. The use of such liquid components tends to reduce the compaction pressure required. The useful range of compaction pressures can be easily determined for any given system by conducting appropriate tests on a few samples produced with varying degrees of compaction.

When screen reinforcement is employed to produce a substrate for automobile exhaust catalyst service, it is preferred that the metal-alumina powder be applied in such quantity per unit area of screen, that when the selected degree of compaction is applied, the powder thickness is reduced to about the thickness of the screen. This will produce the preferred structure described previously, wherein the metal-alumina substrate is wholly contained within the grid of the screen. For example, using type 304 stainless steel screen, 7.9 meshes/cm, 0.24 mm wire, and nickel transition alumina powders (70 wt. % Ni) the appropriate ratio, powder/screen, for a compaction pressure of 5600 kg/cm$^2$ is about 0.10 gm. powder per square centimeter screen. The resultant compact has a thickness of about 0.50 cm which is essentially equal to the original thickness of the screen. The ultimate strength of such screen-reinforced substrates is not measurably affected by degree of compaction, provided that the reinforcement is not significantly deformed in the process. Substrates prepared using the materials and composition ratios of the above example were compressed to varying degrees and sintered at 870° C. for 6 hours in a hydrogen atmosphere. The data given in Table 6 show that overall strength is independent of compaction pressure. Therefore, within a broad range of useful compaction pressures, the degree of compaction may be selected solely to facilitate optimization of strength, loading and performance of the porous substrate secured within the screen grid.

Table 6

| Specimen | Compaction Pressure kg/cm$^2$ | Tensile Strength kg/cm$^2$ |
|---|---|---|
| A | 2812 | 562 |
| B | 5624 | 562 |
| C | 11248 | 562 |

Additional mechanical strength can also be imparted to the composite structure of this invention by means of supports other than metal screens; for example, metal fibers such as steel wool, and solid metal surfaces such as flat metal sheets, round metal tubes and fluted metal tubes. The composite structure of this invention can also be made in the form of tablets or pellets, these forms of unsupported composite being particularly useful in packed bed reactors.

Where the composite structure of this invention is supported by metal fibers the process for producing the supported structure is substantially the same as with support screens, that is, the mixture of metal powder and transition alumina powder is mixed and deposited around the metal fibers with sufficient packing or tamping to eliminate gross voids, and the three component system is then compacted into the desired shape and sintered.

Where a solid metal surface is used as the support for the sintered composite, it is preferable to prepare the metal powder-transition alumina powder mixture in the form of a slurry which also includes an organic solvent and a liquid plastic binder material, and then apply the slurry as a coating to the base metal by dipping or spraying. The resulting coating is then air dried and the bulk of the solvent removed by evaporation, leaving a self-supporting layer of the metal powder-alumina powder mix which is held in place by the remaining binder. The solid metal and coating are then heated to decompose the residual organic material and to effect sintering of the metal powder. In using the slurry method, the metal powder-alumina powder combination generally undergoes sufficient compaction during application of the slurry to retain its desired shape as a layer on the metal surface, or some additional compaction can be provided by mechanically compressing the coating after evaporation of the solvent and before the heating and sintering step.

The above-described method for applying a sintered coating to a metal surface, including details as to solvents and organic binder materials, is disclosed in greater detail in U.S. Pat. No. 3,384,154 to Milton. A two step method for applying a sintered metal coating and which can also be used in the method of this invention is described in U.S. Pat. No. 3,753,757 to Rodgers, et al.

Figure 3B:
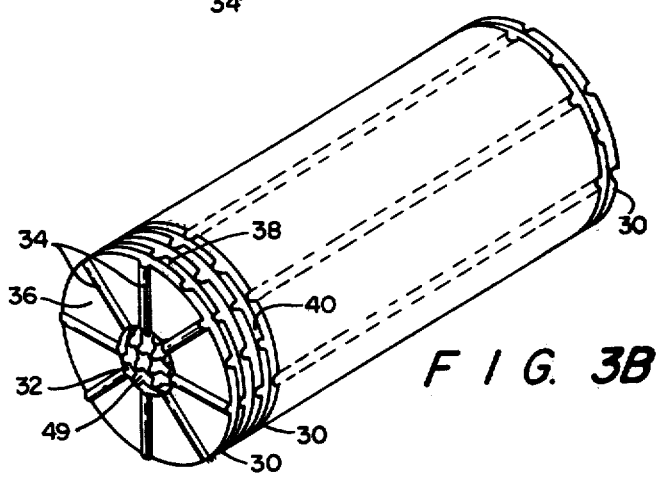
Figure 3C:
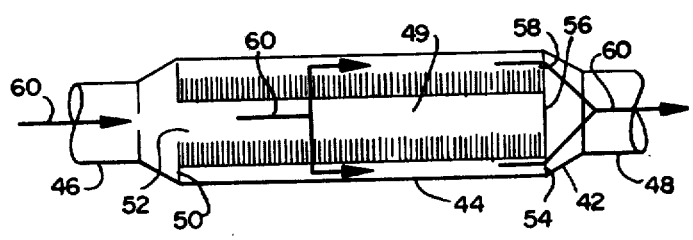

The porous composite structure of this invention can be used in a variety of structural sizes and shapes. Two structures particularly useful for automobile catalytic converts are shown in FIGS. 2 and 3.

FIG. 2 illustrates a catalytic converter in which metal reinforced catalyst support substrates of this invention are helically wound to produce a monolithic mass. FIG. 2 (a) is an isometric exploded view showing the method for carrying out helical winding. A flat strip 10 of metal screen reinforced catalyst support substrate and a corrugated strip 12 of metal screen reinforced catalyst support substrate are preferably stapled together and wound about a solid cylindrical core 14 in the direction of arrow 16 to produce a cylindrical monolithic mass shown in isometric view in FIG. 2 (b) in which the alternating layers of smooth 10 and corrugated 12 catalyst support surround the central core 14. FIG. 2 (c) is an elevational view of an automobile catalytic converter containing the monolithic structure of FIG. 2 (b). The catalytic converter comprises a hollow metal shell 18 which includes a cylindrical center portion 20 which tapers to gas inlet 22 at one end and gas outlet 24 at the opposite end. The monolithic mass of FIG. 2 (b) is disposed within the hollow center portion 20 of shell 18 with the axis of the cylindrical core 14 coincident with the longitudinal axis of shell 18. If desired, conventional thermal insulation can be provided around the monolith to reduce heat loss and shorten the warm-up period. In this configuration the gas flow passages 26 which are defined by the spaces between the flat strip and the corrugated strip are oriented parallel to the flow of exhaust gas through the converter, resulting in good gas flow and pressure drop characteristics. This configuration also reduces the possibility of blockage of the gas passages by particulate matter in the exhaust gas stream.

In a typical converter structure of the type shown in FIG. 2 the flat strip 10 is about 0.4 mm thick and 7.6 cm wide and the corrugated strip 12 is also 7.6 cm wide, approximately 0.4 mm thick prior to corrugation and approximately 3.7 mm thick in its corrugated form. The core 14 is 7.6 cm long and about 2 cm in diameter. About 2.5 meters of the flat strip 10 and about 5 meters of the flat strip in corrugated form 12 are needed to produce a monolithic mass of FIG. 2 (a) which is 7.6 cm long and about 12 cm in diameter, and in which the gas flow passages 26 are 7.6 cm long and approximately 3.7 mm in their maximum cross-sectional dimension in the radial direction.

The corrugations, such as those in strip 12 described above, can be formed either before or after the sintering step by conventional methods such as passing the strip between grooved rollers or by embossment under a stamping machine. Generally only moderate pressure is required to form adequate corrugations, and excessive pressure should be avoided to reduce the possibility that surface pores will be wholly or partially closed, thus inhibiting gas flow into the sintered matrix.

Another suitable structure for an automobile catalytic converter is shown in FIG. 3.

The catalyst support structure for the converter of FIG. 3 is made up of a series of disc shaped elements 30 composed of the porous composite structure of this invention. The discs 30 have an opening 32 in center and a series of radially disposed corrugations 34.

To form the monolithic mass shown in isometric view in FIG. 3 (b), a series of individual discs 30 are stacked one against the other with the openings 32 in axial alignment and with the corrugations 34 on each disc 30 resting against a flat portion 36 of the adjacent element so that each disc is spaced away from the next adjoining disc. The openings defined by the flat surfaces 36 and 38 and corrugations 34 provide gas passages 40 through the monolithic mass.

FIG. 3 (c) is a cross-sectional view of an automobile catalytic converter containing the monolithic mass of FIG. 3 (b). The converter comprises a hollow cylindrical shell 42 having a relatively long center portion 44 which tapers to gas inlet 46 at one end and gas outlet 48 at the opposite end. The monolithic mass of FIG. 3 (b) is disposed in the center section 44 of shell 42 with the large passageway 49 formed by the central openings 32 in the discs 30 coincident with the longitudinal axis of the shell 42. A circular baffle 50 having a central opening 52 is disposed at the inlet end of shell 42 and a circular baffle 54 having a solid center portion 56 and an annular opening 58 is disposed at the gas outlet end of shell 42. Exhaust gas entering the converter is deflected by baffles 50 and 54 and passes through the many gas passages 40 before leaving the converter through opening 58 and gas outlet 48. The solid arrows 60 illustrate the typical pattern of gas flow.

In a typical converter structure of FIG. 3 each disc 30 is approximately 7.6 cm in diameter and 0.4 mm thick with a center opening 32 which is 2.5 cm in diameter and corrugations 34 which extend 0.64 mm above the surface of the disc. About 200 of the discs 30 when stacked together as shown in FIG. 3 (b) form a monolithic mass about 7.6 cm in diameter and about 20 cm long.

The specific dimensions of the catalyst support will be determined by the requirements of the particular application, but there are some design criteria that apply to many applications. The monolothic structure appropriate for auto emission control uses should be arranged so that it has a primary surface area (i.e., the boundary fluid-substrate interface) of at least 325 $m^2/m^3$ of monolith which assures sufficient area to allow ready access of the fluid to the inner regions of the substrate where most of the active area is contained. For a structure such as that shown in FIG. 3 (b) it has been found that the layer-to-layer spacing should be 1.3 cm or less and the number of corrugations in the alternate layers should be at least 0.8 corrugations/cm.

The total size and primary surface area of the monolithic mass will be determined by the available pressure drop for the given application and the required area. The latter limitation is obtained from the operational space velocity (i.e., the volume of process gas/unit time/volume of catalytic converter). The available system pressure drop will determine the geometric shape of the catalytic converter. That is, a large available pressure drop will favor a structure with a small face area and long flow path, whereas a small available pressure drop will favor large face area and short flow path.

When the porous composite structure of this invention is to be used as a catalyst support substrate, there are several methods of catalyst addition that can be used to deposit the desired catalyst on the support. In one method, the catalyst is added to the components of the catalyst support substrate during its manufacture, whereas in a second method, the catalyst is deposited on the support after its manufacture. These methods can be referred to as pre-deposition and post-deposition techniques, respectively.

With the pre-deposition method, the catalyst is dispersed onto the transition alumina prior to the incorporation of the alumina into the catalyst support substrate. The deposition technique involves mixing salts of the catalysts (usually nitrates) in the desired proportions, dissolving them into an aqueous solution, mixing the transition alumina into the solution and then evaporating the water. If the active form of the catalyst is the metal or metal oxide an additional step of heating the mass in a hydrogen, air or other suitable atmosphere to convert the salts into the catalysts (usually metals and/or metal oxides) and to separate the off gases. The advantages of the pre-deposition technique are that it is relatively easy to bring all the transition alumina into intimate contact with the catalyst salt solution, thereby assuring even distribution of the catalyst upon the surface area of the transition alumina. The major disadvantage of the technique is that the catalysts are exposed to the sintering process during the subsequent manufacture of the catalyst support substrate. Exposure of the catalysts to the relatively high temperatures (up to 982° C.) may in some instances reduce catalyst activity.

With the post-deposition technique, the catalyst salt solution is used to saturate the already formed catalyst support substrate and then the mass is heated, as in the pre-deposition technique, in a suitable atmosphere to convert the salts into the catalyst. The advantage of the post deposition method is that it avoids exposing the catalyst to the sintering temperatures. The disadvantages of the post-deposition method are that catalyst is deposited on both the metal and transition alumina components of the substrate (although this is not a serious drawback due to the much higher surface area of the transition alumina) and that it is not always possible to assure even distribution of the catalyst on the transition alumina since the substrate is a rigid porous structure and would depend on capillary action to reach the inner regions of the substrate.

In some instances it may be desirable to use a combination of both pre- and post-deposition techniques. For example, if a two component catalyst is to be employed, one component of which is sensitive to heat while the other component is not, the post-deposition technique can be used for the heat-sensitive catalyst component and the pre-deposition technique for the other catalyst component.

Thus, the catalyst deposition technique to be used depends on the properties of the individual catalysts and the conditions to be used in the manufacture of the catalyst support substrate and the most efficient technique can be easily determined for any given catalyst or catalyst combination.

In addition to its use as an automobile emission control apparatus, the catalyst support substrate of this invention is also useful in sulfur removal from flue gases, control of air pollution with after-burners, and other catalytic reactions, for example, any application requiring any of the following characteristics: high mechanical strength, good thermal stability, non-fouling characteristics, low pressure drop, or effective utilization of the active catalytic component supported on the substrate.

The catalyst support substrate of this invention can be used in the removal of sulfur dixoide from flue gas by employing copper oxide as the catalyst. The sulfur dioxide is removed from the gas stream as a result of the following chemical reaction:

$$CuO + SO_2 + \tfrac{1}{2}O_2 \rightarrow CuSO_4$$

The copper oxide is regenerated by a two step process of heating first in hydrogen and then in oxygen. The regeneration reactions are represented by the following equations:

$$CuSO_4 + 2H_2 \rightarrow Cu + SO_2 + 2H_2O$$

$$Cu + \tfrac{1}{2}O_2 \rightarrow CuO$$

Copper oxide deposited on the catalyst support substrate of this invention is also useful in the removal of hydrogen sulfide from fuel gas. The chemical reaction for H₂S removal is the following:

$$2Cu + H_2S \rightarrow Cu_2S + H_2$$

Regeneration of the copper oxide is then carried out by heating first in oxygen and then in hydrogen. The regeneration reactions are represented by the following equations:

$$2Cu_2S + 5O_2 \rightarrow 2CuO + 2CuSO_4$$

$$CuO + CuSO_4 + 3\,H_2 \rightarrow 2Cu + SO_2 + 3H_2O$$

In the above described reactions for the removal of sulfur dioxide from flue gas and hydrogen sulfide from fuel gas, the copper oxide functions more as a chemisorbent than a catalyst, in that it is consumed in the reaction and has to be periodically regenerated. Thus, for the purposes of this invention, the term "catalyst" includes both conventional catalysts which are not consumed in the course of a catalytic process and chemisorbents which require regeneration from time to time.

The method of depositing copper oxide or other chemisorbent on the catalyst support substrate of this invention is substantially the same as for any of the other catalyst materials, and either the pre-deposition or post-deposition techniques described hereinabove can be employed.

The following more detailed examples further illustrate the invention.

Example I

This example employed pre-deposition of a platinum catalyst on the transition alumina. The catalyst-loaded alumina was combined with nickel and then formed into pellets and sintered. A packed bed of the pellets was used in tests to demonstrate its effectiveness in removing oxidation type pollutants (i.e., hydrocarbons and carbon monoxide) from automotive exhaust gases.

The platinum catalyst was pre-deposited on the transition alumina by dissolving 2.66 gm of H₂PtCl₆.6H₂O (equivalent to 1 gm of Pt metal) in 50 cc water, adding 99 gm of transition alumina (Alumina #1 of Table 2, 325 mesh size, i.e. 128 meshes/cm) and heating the mass at 110° C. for 24 hours. The mass was then further heated at 300° C. in an atmosphere (15% $H_2$ in $N_2$) designed to reduce the catalyst salt to the desired platinum metal. After heating for 24 hours, the mass was cooled to ambient temperature in a nitrogen atmosphere.

After cooling, the catalyst-loaded transition was ground to a 325 mesh size and combined with fine nickel powder (400 mesh size, i.e. 158 meshes/cm) in the proportions of 20 gm alumina and 80 gm nickel. The mixture was uniformly blended in a ball-mixing device and then compacted into 4.76 mm diameter pellets, 3.2 mm long by means of a conventional pelletizing apparatus. The pellets were sintered in a $H_2$ atmosphere for 6 hours at 870° C. After cooling, the pellets were ready to be used in the catalytic converter. The pellets had a surface area of 29 $m^2$/gm and bulk density of about 1.9 gm/$cm^3$. A simulated automobile exhaust stream composed of CO—0.8%, $C_3H_6$—400 ppm, $O_2$—1%, NO—1380 ppm, helium—balance, was passed through a bed of these pellets 2.5 cm long and 2.5 cm in diameter at a bed inlet temperature of 500° C. The following results were obtained:

| Bed Space Velocity | CO Conversion, % |
|---|---|
| ($cm^3$ gas (NTP)*/hr/$cm^3$ bed volume) | |
| 17,000 | 89 |
| 33,000 | 88 |
| 110,000 | 78 |

*NTP — normal temperature and pressure — 20° C. and 760 mm $H_2$

These results show good performance of the reactor system.

Example II

This example illustrates the use of a catalyst support substrate prepared by pre-loading of a noble metal-promoted multi-component transition-metal oxide catalyst on transition alumina. The catalyst-loaded alumina was then combined with nickel powder, compacted into a stainless steel screen, and sintered to form a reinforced catalyst support substrate already loaded with the catalyst. The reinforced substrate was then stacked in a monolith that was used as a catalytic converter in a simulated automobile exhaust.

A catalyst solution was prepared by combining the following:

5 gm. Cu as 19.1 gm. of $Cu(NO_3)_2 \cdot 3H_2O$
5 gm. Mn as 38.2 gm. of 50% aqueous $Mn(NO_3)_2$
5 gm. Cr as 38.4 gm. of $Cr(NO_3)_3 \cdot (H_2O)$
0.063 gm. Pd as 1.35 gm. of 10% aqueous $Pd(NO_3)_2$ and dissolving them in 20 cc of water. The transition alumina (85 gm. of Alumina #1 of Table 2, 325 mesh size) was then added and the entire mass was mixed and heated to drive off the water. The mass was then broken up and heated in an atmosphere (15% $H_2$ in $N_2$) to reduce the catalyst salts to the metal oxides. The catalyst-loaded alumina was then combined with fine nickel powder (400 mesh size) in the proportion of 30 gm. catalyst-loaded alumina and 70 gm. nickel powder. This mixture was compacted by means of a hydraulic press into a 310 Stainless Steel screen (18×18 mesh size, i.e. 7.1 meshes/cm, 0.23 mm wire). The powder mixture was used at a loosely packed depth of 1.0 mm and the screen was compacted into it at a pressure of 5625 kg/$cm^2$ to a composite thickness of 0.5 mm. After compaction, the green substrate was sintered in a hydrogen atmosphere at 870° C. for 6 hours. After sintering eleven tests strips (0.97 cm×5 cm×0.5 mm) were stacked with alternate strips of blank screen to form a test unit in the form of a stacked monolith. The test monolith was enclosed in a suitable shell so that it could be heated with a tubular electric furnace to the desired operation temperature. Reactant inlet gas was introduced into the test unit and flowed parallel and through the major length of the monolith. The inlet gas (composed of prepared mixtures) was preheated to the desired inlet temperature and flow regulated to obtain the desired space velocity for the catalytic converter. The outlet gas was analyzed using a mass spectograph. The inlet gas had a simulated automobile exhaust composition of CO—0.8%, $C_3H_6$—400 ppm, $O_2$—1%, NO—1380 ppm, 10 wt.% water, helium—balance. The following results were obtained at an inlet gas temperature of 500° C.

| Converter Space Velocity | CO Conversion, % |
|---|---|
| ($cm^3$ gas (NTP)/hr/$cm^3$ converter volume) | |
| 17,300 | 92 |
| 34,600 | 90 |
| 120,000 | 65 |

Example III

In this example the substrate preparation and test procedures of Example II were followed except that 310 Stainless Steel powder was used in place of nickel powder and the sintering step was carried out at 980° C. for 6 hours. The following results were obtained:

| Converter Space Velocity | CO Conversion, % |
|---|---|
| ($cm^3$ gas (NTP)/hr/$cm^3$ converter volume) | |
| 17,000 | 91 |
| 34,000 | 90 |
| 100,000 | 45 |

Example IV

This example employed a commercially available pre-deposited platinum catalyst on transition alumina containining 0.5 wt.% platinum. The catalyst was combined with 310 stainless steel powder in the proportions 30 gm catalyst and 70 gm metal powders and compacted into a 310 stainless steel screen as in Example II except the 0.95 cm×5 cm×0.5 mm strips after compaction was sintered in hydrogen atmosphere at 927° C. for 3 hours, and was tested in the same was as Example III except that inlet gas had a simulated automobile exhaust composition of CO—1%, $C_3H_6$—300 ppm, $O_2$—1%, water vapor—10 wt.%, nitrogen-balance gave results as follows:

| Converter Space Velocity | CO Conversion, % |
|---|---|
| ($cm^2$ gas (NTP)/hr/$cm^2$ converter volume) | |
| 17,000 | 98 |
| 34,000 | 92 |
| 100,000 | 74 |

Example V

This example was carried out in the same way as Example IV except platinum catalyst (0.5 wt.-% Pt) was prepared as described in Example I. The following results were obtained:

| Converter Space Velocity | CO Conversion, % | $C_3H_6$ Conversion, % |
|---|---|---|
| (cm³ gas (NTP)/hr/ cm³ converter volume) | | |
| 17,000 | 98 | — |
| 34,000 | 88 | 90 |
| 100,000 | 80 | 78 |

Example VI

This example illustrates the preparation and use of a post-deposited noble metal-promoted multi-component transition-metal oxide catalyst on a catalyst support substrate prepared by combining 310 stainless steel powder and transition alumina in the proportions of 70 gm of 310 stainless steel powder and 30 gm of transition alumina. The mixture was compacted by means of a hydraulic press into a 310 stainless steel screen (18×18 mesh, 0.23 mm wire) as in Example II. After compaction, the green substrate was sintered in a hydrogen atmosphere at 929° C. for 3 hours. The sintered catalyst support strips (0.95 cm×5 cm×0.5 mm) were then loaded with catalyst from a solution containing:

5.3 gm Cu $(NO_3)_2.3H_2O$
9.1 gm Mn $(NO_3)_2$-50% aqueous
10.8 gm Cr $(NO_3)_2.6H_2O$
0.061 gm Pd.$(NO_3)_2$
26.8 gm methanol (35 cc)

by dipping and drying. Two successive applications of catalyst solution gave an approximate catalyst composition based upon transition alumina of 5 wt.% Cu, 5 wt.% Mn, 5 wt.% Cr and 0.1 wt.% Pd as oxides after removal of water, methanol and oxides of nitrogen. Tested in the same manner as Example V, the following results were obtained:

| Converter Space Velocity | CO Conversion, % |
|---|---|
| (cm³ gas (NTP)/hr/cm³ converter volume) | |
| 17,000 | 90 |
| 34,000 | 74 |
| 100,000 | 30 |

Example VII

A life test of palladium-loaded substrate of this invention was conducted under conditions simulating automotive exhaust service. The substrate was prepared and loaded as follows:

A quantity of −325 mesh transition alumina (Alumina #2 of Table 2) was pretreated by heating, first in a hydrogen atmosphere at 927° C. for 3 hours, then in steam at 871° C. overnight. The alumina was then blended with −325 mesh 310L stainless steel in proportions 70 wt.% stainless steel, 30 wt. % alumina and mixed thoroughly. The powder was compacted at 5625 kg/cm² into 0.23 mm wire 18×18 mesh 310 stainless steel screen and sintered at 1700° F. for 3 hours in hydrogen. The finished thickness was about 0.5 mm.

The substrate was soaked in a solution prepared by dissolving 1.3 gm Pd$(NO_3)_2$ in 50 cc methanol and the absorption of solution by the substrate was such as to infuse 0.8% by weight elemental palladium based on the weight of alumina. The wet substrate was dried and then heated in air at 816° C. for 18 hours to decompose the the nitrate and form the PdO catalyst.

Nine strips of the catalyst-loaded substrate each 9.5 mm wide 25 mm long were stacked with 0.5 mm diameter chromium steel wire spacers and fitted into a rectangular refractory tube 14 mm × 11 mm inside dimensions. The tube was installed in a furnace and connected to sources of gas mixtures to be described.

The following series of tests were conducted to determine catalyst activity, surface area stability, and structural durability.

| | | |
|---|---|---|
| (a) Lightoff tests: | A gas mixture was prepared of the following composition: | |
| | CO | 0.5% |
| | $O_2$ | 1.0% |
| | $H_2$ | 0.17% |
| | Hydrocarbon (Propane) | 150 ppm |
| | $H_2O$ | Saturated at 50–51° C. |
| | $N_2$ | Balance |
| | This mixture was passed through the tube at a space velocity (cm³ gas (NTP)/hr/cm³ bed volume) of 34,000 while the temperature was gradually increased. The temperature at which 50% of the influent CO was removed was recorded by means of an infra-red analyzer as the lightoff temperature. | |
| (b) CO Removal tests: | A gas mixture was prepared of the following composition: | |
| | CO | 1% |
| | $O_2$ | 1% |
| | $H_2$ | .33% |
| | Hydrocarbon (Propane) | 300 ppm |
| | $N_2$ | Balance |
| | This mixture was passed through the tube at variable space velocity while holding the effluent temperature at 500° C. After equilibration, the percent removal of CO was recorded and occasionally, the percent removal of hydrocarbons. Space velocities (same as test (a) above) of 17,000, 34,000 and 100,000 were applied. | |
| (c) Steaming tests: | A gas mixture was prepared of the following composition: | |
| | $O_2$ | 1% (dry basis) |
| | $H_2O$ | 10% (wet basis) |
| | $N_2$ | Balance |
| | This mixture was passed through the tube for 16 hours with the furnace temperature held at 816° C. The results of lightoff and CO removal tests were compared to quantify the effect of steaming. | |
| (d) Durability tests: | The gas mixture described for the CO removal tests was passed through the tube at steady space velocity (same as test (a) above) of 10,000 with the furnace adjusted to maintain an effluent temperature of 500° C. After selected intervals of time, space velocities were momentarily increased to prescribed values for CO -removal determinations After 420 hours operation, 15 ppm $SO_2$ was continually added to the gas | | mixture to evaluate catalyst resistance to sulfur poisoning. This was increased to 25 ppm after 550 hours and continued through the remainder of the life test. The duration of the test was 2200 hours, equivalent to about 55,000 miles of normal service in an automobile.

The effectiveness of the catalyst loaded substrate of this invention remain substantially the same during the entire 2,000 hour period. With a space velocity of 34,000 between 80% and 90% of the carbon monoxide was removed and at a space velocity of 100,000 between about 65% and 75% of the carbon monoxide was removed. About 80% of the hydrocarbon content of the gas stream was removed.

The activity of the catalytic system was reduced for a short period of time immediately following steaming, but the activity was fully restored after the steaming tests were completed.

The addition of sulfur dioxide as described above had no detectable effect on catalyst activity.

During the third steaming test, the oxygen content of the gas was inadvertently increased to an unknown higher value for about 16 hours without any detectable decrease in the performance of the catalyst loaded substrate.

Lightoff determinations made during the series of steaming tests are summarized in the following Table. The low lightoff values attest to a high surface area substrate. The stability of the lightoff values during steaming tests shows that high surface area was maintained and that no deleterious interactions occurred between substrate and catalyst. The sustained low values of lightoff and high values of CO removal throughout the life test are further evidence of an extremely stable surface area. Following the life tests, inspection showed that the substrate had retained ductility and that the sintered matrix was still securely held within the screen reinforcement.

| Catalyst-Substrate Condition | Lightoff (°C.) |
|---|---|
| Fresh | <164° |
| After 1st Steaming | <167° |
| After 2nd Steaming | <168° |
| After 3rd Steaming | <195° |
| After 4th Steaming | <182° |

The strips of catalyst-loaded substrate used in the foregoing test were originally sheared from larger pieces of substrate, and the scrap material was saved for "before" and "after" comparison of substrate properties. Surface area measurements (surface area based on substrate does not include the reinforcing screen) made on the fresh, unused material and on the strips which had completed the 2000-hour test showed the following:

| | Surface Area Based on Substrate | Surface Area Based on Alumina |
|---|---|---|
| Before | 25 m²/gm | ~ 80 m²/gm |
| After | 38 m²/gm | ~ 125 m²/gm |

These data show that, within the experimental error of the surface area measurements, there was no significant change in the surface area during the 2000-hour tests.

Example VIII

A full-scale automotive exhaust reactor was built and tested on an automobile engine. A description of construction and preparation of the reactor follows:

Quantities of 310L stainless steel powder and transition alumina (Alumina #2 of Table 2) were separately screened through a 325 mesh sieve. Pre-treatment of alumina was accomplished by heating the powder in nitrogen at 927° C. and then heating in steam at 871° C. overnight. The powders were blended in proportions 70 wt.% stainless steel powder and 30 wt.% alumina and then thoroughly mixed. This dry mixture was compacted at 5625 kg/cm² into a 3-inch wide strip of 310 stainless steel screen, 18×18 mesh×0.23 mm diameter wire. The powder-loaded screen was then sintered at 927° C. for 3 hours in a hydrogen atmosphere.

After sintering, the substrate was loaded with palladium oxide catalyst by soaking the strip at normal temperature and pressure in a solution of palladium nitrate in methanol followed by air-drying. The absorptivity of the substrate for the solution was predetermined, and the strength of the solution was adjusted so that in two steps of soaking and drying, the amount of elemental palladium infused into the substrate was 1% of the weight of the alumina component of the substrate. The air-dried strip was heated 16 hours in air at 816° C. in order to decompose the nitrate and form the PdO catalyst in the support.

About 9.75 meters of the catalyst-loaded substrate was wound around a 19 mm O.D.×0.7 mm wall nickel steel tube 7.5 cm long. Two 12.5 mm wide strips of the same stainless steel screen without powder-loading were wound together with the 7.5 cm wide strip, one at each edge of the roll, and served as spacers between laps. For the last three laps, solid 12.5 mm wide strips of 310 stainless steel 0.3 mm thick were substituted for the 12.5 mm wide screen strips to serve as outer bindings, the ends of which were welded to secure the coil. The finished coil was 12 cm diameter and weighed 1.2 kg. The coil was fitted into a flanged casing and sealed by bolting to form a complete reactor of the general shape shown in FIG. 2 (c).

The completed reactor was installed on a stationary 1971 Ford V-8 engine, 4900 cm³ displacement, so that it received exhaust gas from one side of the engine (4 cylinders). The engine was run on premium non-leaded gasoline. On the other side of the engine, receiving the exhaust from the opposite 4 cylinders was an all-ceramic monolithic catalytic reactor composed primarily of alpha-alumina coated with transition alumina and loaded with platinum catalyst. Results of the 80-hour test are summarized in Table below. The pressure drop was measured across the reactors by pressure taps placed in closely adjacent connecting piping.

Results show that from the standpoint of catalyst compatibility, the substance of this invention is as good or better as a catalyst support under service conditions than the highly porous, all-ceramic substrate.

| Reactor | Engine Speed (RPM) | T in (°C.) | T out (°C.) | CO Composition (%) | | | | | | Pressure Drop (mm Hg) |
|---|---|---|---|---|---|---|---|---|---|---|
| | | | | No Air | | | Air Addition | | | |
| | | | | In | Out | In-Out/In, % | In | Out | In-Out/In, % | |
| Ceramic | 1500 | 410 | — | .30 | .02 | 93 | .3 | .03 | 90 | — |
| This invention | 1500 | 410 | 427 | .28 | .02 | 93 | .28 | .02 | 93 | — |
| Ceramic | 1500 | 441 | — | .40 | .04 | 90 | .48 | .03 | 94 | 5.2 |
| This invention | 1500 | 437 | 454 | .45 | .01 | 98 | .48 | .01 | 98 | 4.5 |
| Ceramic | 2500 | 627 | 693 | 1.34 | 1.00 | 25 | 1.35 | .57 | 58 | — |
| This invention | 2500 | 599 | 688 | 1.60 | 1.15 | 28 | 1.60 | .54 | 66 | — |
| Ceramic | 2500 | 620 | 688 | 1.46 | 1.00 | 32 | 1.22 | .37 | 70 | 11.6 |
| This invention | 2500 | 584 | 666 | 1.54 | 1.06 | 31 | 1.31 | .30 | 77 | 12.0 |

Example IX

The same reactor containing catalyst-loaded substrate of this invention that was employed in the engine tests of Example VIII was installed in a standard 1973 Vega (2294 cm$^3$) displacement). A standard 1972 Vega air pump was also installed to inject air into the exhaust stream near the manifold. No choke or carburetor adjustments were made. The following results were obtained with and without the reactor.

| Component | Grams/mile in engine exhaust | | | |
|---|---|---|---|---|
| | Cold Start | Stabilized | Hot Start | Total |
| Hydrocarbon | | | | |
| Without Reactor | .72 | .35 | .42 | 1.49 |
| With Reactor | .15 | .14 | .24 | .53 |
| % Reduction | 79% | 60% | 43% | 64% |
| Carbon Monoxide | | | | |
| Without Reactor | 8.12 | 2.90 | 2.22 | 13.24 |
| With Reactor | 2.03 | .54 | .82 | 3.39 |
| % Reduction | 75% | 81% | 63% | 74% |

Example X

A sintered substrate of this invention was prepared by the same method as the substrate of Example VII.

The sintered substrate was catalyst-loaded by dipping into 100 ml methanol solution containing 57 gms. Cu(NO$_3$)$_2$.3H$_2$O. Two dipping operations with intervening air-drying, resulted in a loading of 15% copper (as CuO) based on alumina. The material was then heated in air at 350° C. to decompose the nitrate. The CuO in this Example functions as a chemisorbent.

The catalyst-loaded substrate was wound into a roll 2.5 cm diameter and the roll was installed in a 2.5 cm ID ceramic tube. The tube was inserted in a furnace equipped with an electric heater and was attached to gas sources to be described.

A feed gas was prepared of the following composition: 9.6% CO$_2$, 0.7% SO$_2$, 9.03% O$_2$, balance N$_2$ (dry basis). The gas was then saturated with H$_2$O at about 52° C. After preheating the furnace to 399° C., the resultant gas mixture was fed to the reactor tube at a space velocity of about 590 hr$^{-1}$ based on total volume occupied by the rolled substrate. The effluent was analyzed frequently at known intervals of time from commencement of feed flow. Breakthrough of SO$_2$ was defined as the moment when the SO$_2$ content of the effluent rose to 10% of the feed value, i.e., about 800 ppm, representing 90% removal. Under the foregoing conditions, breakthrough was observed after 30–45 min. operation. Repeated cycles of regeneration and loading did not appear to reduce the effectiveness of the chemisorbent.

Another series of tests was conducted using a similar substrate loaded 30 wt.% copper as CuO. The feed gas consisted of 1% SO$_2$, 10.4% CO$_2$, 1.95% CO, 0.03% O$_2$, balance N$_2$ (dry basis), and again the gas was water saturated at about 52° C. Breakthrough at space velocity of 590 hr$^{-1}$ was observed at times between 56 and 79 minutes, corresponding to removal of about 90% of the sulfur dioxide.

Example XI

Screen reinforced catalyst substrate was prepared in accordance with the specifications of Example VIII hereinabove. Instead of palladium oxide, the substate was loaded with a copper-chromium oxide chemisorbent for removing H$_2$S from a simulated fuel gas. (The chromium oxide functions as a dispersing agent for the copper and is not itself a chemisorbent. The sintered substrate was dipped in a solution containing 60 gm Cu (NO$_3$)$_2$.3H$_2$O and 12.1 gm Cr (NO$_3$)$_3$.9H$_2$O per each 100 ml methanol. After drying and calcining to CuO and Cr$_2$O$_3$, the loading based on alumina was 14% by weight Cu and 1.4% by weight Cr. The loaded substrate was then heated in a hydrogen containing atmosphere to reduce the CuO to Cu metal. Coupons of the screen-reinforced substrate 7.6 cm square were stacked with spacers to provide a bundle height of 3.2 cm.

A feed gas consisting of 2000 ppm H$_2$S, 25% H$_2$, balance helium was passed through the bed at a space velocity of 5500 hr$^{-1}$ and a temperature of 350° C. The concentration of H$_2$S in the effluent was measured at selected intervals of time. Results show that during the first portion of the cycle, through 50%- utilization of bed capacity, over 90% of the incident H$_2$S was removed from the gas. When effluent H$_2$S reached 1000 ppm (50% removal of incident H$_2$S), over 95% of the bed capacity had been utilized and over 80% of the total H$_2$S supplied during the cycle had been absorbed.

Example XII

A comparative test was conducted to demonstrate performance of the catalyst support substrates of present invention for chemisorption of sulfur dioxide, relative to an all-alumina, pelleted catalyst support. A first reactor was prepared using 70% by weight 310 stainless steel powder and 30% by weight transition alumina. The mixed powders were reinforced with type 310 stainless steel screen, 18×18 mesh (7.1 meshes/cm, 0.23 mm wire), sufficient powder being used to provide a finished substrate thickness of 18 mils (0.5 mm). The substrate was compacted to 5625 kg/cm$^2$ and sintered at 870° C. for 6 hours in a hydrogen atmosphere. Twenty-four flat strips of this substrate each 7.6×15.3 cm were loaded with copper in accordance with the procedure of Example X resulting in a final content of 11.5 wt% copper (as Cu based on alumina, or 14.4 wt% as CuO based on alumina). The strips were then stacked with spacers to provide bundle 3.2 cm high.

A second reactor was prepared using transition alumina granules −8 to +14 mesh size (<2.38 mm, >1.41 mm). The granules were soaked in a solution of 454 gm $Cu(NO_3)_3 \cdot 3H_2O$ in 900 ml methanol for 2 minutes, dried, soaked again, dried and calcined. The final content was 8.5 wt.% Cu (10.7 wt.% as CuO). Five catalyst strips were prepared each consisting of a layer of the above granules, each strip 7.6 cm×21.5 cm×3.2 mm thick, sandwiched between flat pieces of 20 mesh stainless steel screen (7.9 meshes/cm). The strips were stacked with pieces of 6 mesh stainless steel screen (2.36 meshes/cm) inserted between the ends to provide about 3.2 mm spacing and producing a bundle 3.2 cm high.

The two test reactors were both operated with a feed gas consisting of 3000 ppm $SO_2$, 1.5% $O_2$, 6% $H_2O$ and $N_2$. The gas was introduced to each reactor at a space velocity of 1500 $hr^{-1}$ and a temperature of 344° C. and measurements were made of residual $SO_2$ in the effluent gas at selected time intervals.

Results with the reactor containing substrate of this invention showed essentially complete removal of $SO_2$ for a substantial period of time after which the concentration rose rapidly, indicative of a sharp mass transfer front which in turn indicates effective use of the chemisorbent in the reactor. In contrast, the encaged pellet reactor produced a near-linear increase in $SO_2$ concentration in the effluent indicating a long, diffuse mass transfer front and less effective utilization of chemisorbent.

In both tests, the $SO_2$ in the effluent reached about 420 ppm after 49 minutes operation, which concentration is near the maximum desirable level for release of stack gas from coal-fired power plants. Therefore, both substrates would have about the same on-stream time before being removed for regeneration. However, during the 49-minute period, the encaged pellet reactor (because of the near linear increase in $SO_2$ in the effluent as described hereinabove) permitted 2.2 times as much $SO_2$ to pass through into the atmosphere as did the reactor containing the substrate of this invention.

What is claimed is:

1. A porous composite structure comprising a sintered mixture of metal particles and alumina particles characterized by the following parameters:
   at least 50 weight percent of the particles in the composite are metal particles;
   at least 5 weight percent of the particles in the composite are alumina particles having a surface area of at least 25 square meters per gram; and
   the inter-particle porosity in the composite structure is between 5 volume percent and 60 volume percent.

2. The composite structure in accordance with claim 1 wherein about 70 weight percent of the particles are metal particles.

3. A porous composite structure in accordance with claim 1 consisting essentially of a sintered mixture of metal particles and alumina particles characterized by the following parameters:
   at least 10 weight percent of the particles in the composite are alumina particles having a surface area of at least 25 square meters per gram.

4. The composite structure in accordance with claim 3 wherein about 70 weight percent of the particles are metal particles.

5. A support structure for catalytic materials comprising the combination of a metal screen material having deposited thereon a sintered mixture of metal particles and alumina particles, characterized by the following parameters:
   at least 50 weight percent of the particles in the sintered mixture are metal particles;
   at least 5 weight percent of the particles in the sintered mixture are alumina particles having a surface area of at least 25 square meters per gram; and
   the inter-particle porosity in the sintered mixture is between 15 volume percent and 60 volume percent.

6. A support structure for catalytic materials in accordance with claim 5 comprising the combination of a metal screen material having deposited thereon a sintered mixture consisting essentially of metal particles and alumina particles characterized by the following parameters:
   at least 10 weight percent of the particles in the sintered mixture are alumina particles having a surface area of at least 25 square meters per gram.

7. The support structure in accordance with claim 6 wherein said metal particles are nickel or stainless steel.

* * * * *